Dec. 20, 1955 A. ISAACSON 2,727,424
EDUCATIONAL XYLOPHONE
Filed Sept. 22, 1954 2 Sheets-Sheet 1

INVENTOR.
Anson Isaacson
BY
George E. Frost
Atty.

Dec. 20, 1955  A. ISAACSON  2,727,424
EDUCATIONAL XYLOPHONE
Filed Sept. 22, 1954  2 Sheets-Sheet 2
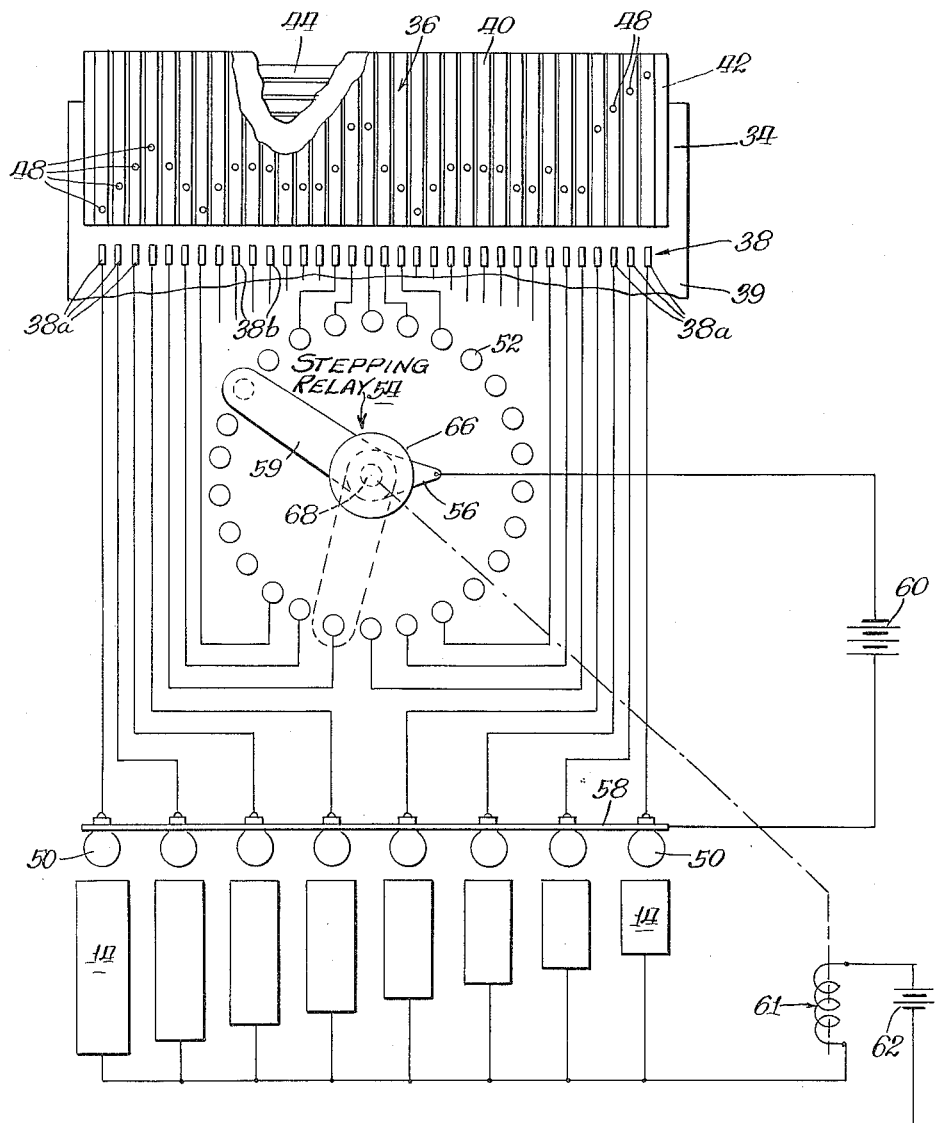
Fig. 2.
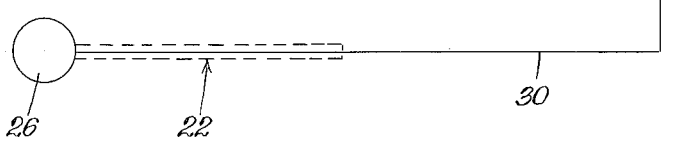
INVENTOR.
Anson Isaacson
BY
George E. Frost
Atty.

United States Patent Office

2,727,424
Patented Dec. 20, 1955

2,727,424

EDUCATIONAL XYLOPHONE

Anson Isaacson, Elgin, Ill.

Application September 22, 1954, Serial No. 457,601

8 Claims. (Cl. 84—477)

The present invention relates to an educational xylophone wherein the striking of each successive sounding bar on the xylophone actuates mechanism to indicate the sounding bar to be next struck.

In my co-pending patent applications Serial Number 401,543, filed December 31, 1953, entitled "Educational Piano," Serial Number 426,747, filed April 30, 1954, entitled "Tune Card and Instrument Using Same," and Serial Number 436,207, filed June 11, 1954, entitled "Indicating Musical Instrument and Tune Card Therefor," I disclose and claim an improvement in indicating musical instruments and tune cards therefor, giving as a specific illustration an educational piano wherein the striking of each successive key actuates mechanism which indicates the next key to be struck. The present application discloses and claims an educational xylophone in which striking the bars of the xylophone with the xylophone hammer actuates mechanism which indicates the next bar to be struck for the particular tune being played.

Briefly, the xylophone has a series of bars which produce sounds when struck with the xylophone hammer, the length of the bars being selected to produce a series of notes, covering an octave for an example. The act of striking one of the bars of the xylophone actuates means to indicate by illumination the next bar which is to be struck. The illumination means is commanded by a tune card, which is inserted in the means, to illuminate the next sounding bar for the particular tune impressed upon the tune card. In order to play a particular tune, it is necessary to first fabricate a tune card for the tune, but thereafter, the illuminating means of the xylophone will guide the player through the tune.

It is therefore a general object of the present invention to provide an educational xylophone in which the striking of each successive bar of the xylophone causes an indication of the next bar to be struck.

Further, it is an object of the present invention to provide an educational xylophone of the aforementioned type adapted to receive replaceable tune cards, so that the xylophone will indicate the notes for many musical selections.

Further, it is an object of the present invention to provide an improved educational xylophone that is simple, inexpensive and reliable in construction, and can be readily adapted to xylophones of all sizes and types.

The novel features which the inventor believes to be characteristic of his invention are set forth with particularity in the appended claims. His invention itself, however, both as to its organization and method of operation, together with further objects and advantages thereof, will best be understood by reference to the following description, taken in connection with the accompanying drawings, in which:

Figure 2 is a schematic electrical diagram of the xylophone illustrated in Figure 1.

Figure 1:
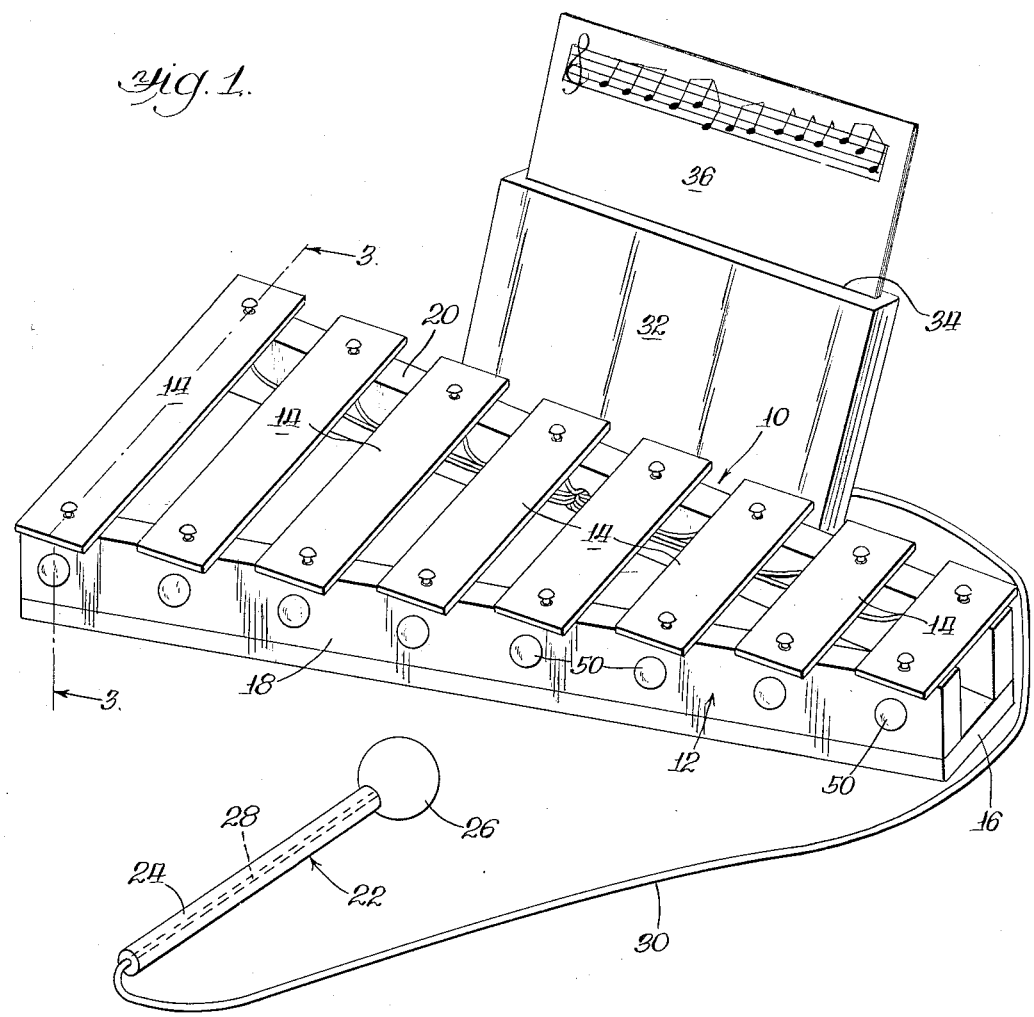
Figure 1 is an isometric view of an educatinal xylophone constructed according to the teachings of the present invention.
Figure 3:
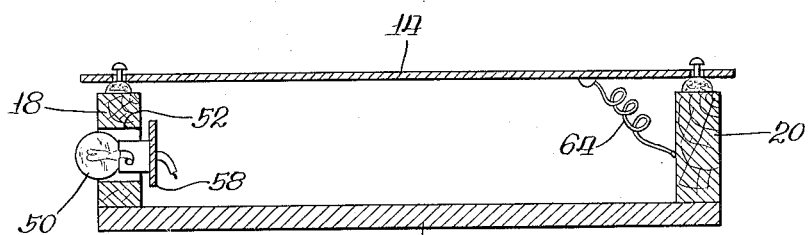
Figure 3 is a sectional view taken along the line 3—3 of Figure 1.

As indicated in Figure 1, an educational xylophone constructed according to the teachings of the present invention has a xylophone mechanism 10 which includes a frame 12 and sounding bars 14. The frame 12 has a base 16 which supports a pair of bar shaped members 18 and 20 which diverge from each other. The sounding bars 14 are suspended between the members 18 and 20 and are supported on the members 18 and 20. As illustrated, there are eight sounding bars 14, thus producing a xylophone with a one octave range.

The sounding bars 14 of the xylophone are struck by a hammer 22. The hammer 22 has a handle 24 constructed of electrically insulating materials, such as wood or plastic, and a head 26 which is constructed of electrically conducting materials. The head 26 may be constructed of any solid electrically conducting materials, such as brass or aluminum. The handle 24 of the hammer is provided with an axial bore 28, and an electrical conductor 30 extends through the bore 28 and makes electrical contact with the head 26 of the hammer 22.

The electrical conductor 30 extends to a circuit housing 32 disposed adjacent to the xylophone mechanism 10. The circuit housing 32 is provided with a slot 34 for the insertion of a tune card 36. As will be explained in detail hereinafter, the tune card 36 provides the electrical contacts necessary to indicate the order of succession of notes for a particular tune, each tune card 36 being limited to the indication of a single tune when inserted in the slot 34.

As indicated in Figure 2, a row of equally spaced contacts 38 are disposed on a terminal board 39 adjacent to the bottom of the slot 34 and these contacts 38 make friction contact with electrically conducting strips 40 disposed upon the contact side 42 of the tune card 36 when the tune card 36 is fully inserted in the slot 34. The strips 40 are spaced from each other by the same distance as the contacts 38, and the strips 40 extend parallel to the direction of insertion of the tune card 36 into the slot 34. The non-contact side of the tune card 36 is provided with electrically conducting parallel strips 44 which are normally disposed relative to the strips 40 and insulated from each other in the same manner as the strips 40. There are the same number of strips 44 as there are sounding bars 14 on the xylophone mechanism 10, namely eight as ilustrated.

As illustrated in Figure 2, the four conducting strips 40 at the right are electrically connected to the top four conducting strips 44 on the non-contact side of the tune card 36 by rivets 48 which extend between the strips 40 and 44 and are electrically conducting. In like manner, electrically conducting rivets 48 are disposed between the four electrically conducting strips 40 at the left hand of the tune card 36 and the bottom four electrically conducting strips 44 on the non-contact side of the tune card 36. In this manner, the eight outboard contacts, designated 38a are connected to the eight electrically conducting strips 44 on the non-contact side of the tune card 36 when the tune card 36 is disposed in the slot 34. Each of these contacts 38a is connected to one of the two terminals of one of the indicating lamps 50, there being one lamp 50 for each of the sounding bars 14, and each of the lamps 50 being mounted in an aperture 52 in the member 18 of the frame 12 adjacent to the sounding bar 14 which the lamp is to indicate.

The inboard contacts 38b between the outboard contacts 38a on the terminal board 39 are connected to the terminals 52 of a stepping relay 54. The pole terminal 56 of the stepping relay 54 is connected to a bar 58 of electrically conducting material through a power source 60, and the bar 58 is in contact with one of the terminals of each of the lamps 50. Each of the electrically conducting strips 40 on the contact side 42 of the tune card 36 intermediate of the four outboard strips 40 is also connected to one of the strips 44 on the non-contact side of the tune card 36 by an electrically conducting rivet 48. These rivets 48 are positioned in the electrically conducting strips 40 to contact the desired electrically conducting strip 44 on the non-contact side of the tune card 36 to indicate the proper sounding bar 14 to be played next.

The stepping relay 54 has a contact arm 59 mounted on a rotatable shaft 68 which makes electrical connection between the pole terminal 56 and one of the terminals 52, and is positioned by the number of pulses received by a coil 61 of the stepping relay 54. The coil 61 has one end connected to each of the sound bars 14 of the xylophone mechanism 10, and the other end of the coil 61 is connected to the electrically conducting head 26 of the hammer through the electrically conducting wire 30. A source of power 62 is connected between the coil 61 and the head 26 of the hammer 22 to actuate the coil and move the arm 59 from one of the terminals 52 to the next adjacent terminal. A helical coil of flexible wire 64 is electrically connected to each of the sound bars 14 and forms a part of the electrical connection to one of the ends of the coil 61 of the stepping relay 54.

When a tune card 36 is disposed within the slot 34, one of the lamps 50 is at all times receiving energy through the arm 59 of the stepping relay 54, and the particular lamp receiving the energy indicates the sounding bar 14 which is to be struck next in order to produce the succeeding note of the tune impressed upon the particular tune card 36. When the sounding bar 14 indicated by the lamp 50 receiving energy is struck, the stepping relay 54 is energized and the contact arm 59 is rotated to the next adjacent terminal 52, thereby forming a new circuit through the tune card 36. In this manner, the player of the xylophone need only follow the illuminated lamps to play the tune impressed upon the tune card 36.

The stepping relay 54 has been provided with a knob 66 attached to the shaft 68 of the stepping relay 54 for the purpose of setting the arm 59 of the stepping relay 54 at the starting point of the tune on the tune card 36, indicated by the dotted line in Figure 2. It is of course possible that the initial setting of the stepping relay 54 could be provided by an electrical mechanism rather than a mechanical one.

The stepping relay 54 may be any one of the constructions well known in the art. Typically, such a relay includes an armature which is attracted by current flow in coil 61 against the bias of a spring. The armature is coupled with a pawl which engages a ratchet on the shaft 68, so that when the armature is pulled against the spring bias the pawl engages the ratchet to advance the shaft 68 and selector arm 59 one step. Successive energizations of the solenoid 61 accordingly advance the arm 59 in step-by-step fashion.

While I have shown and described a specific embodiment of the present invention, it will of course, be understood that various modifications and alternative constructions may be made without departing from the true spirit and scope of the invention. It is therefore intended by the appended claims to cover all such modifications and alternative constructions falling within their true spirit and scope.

What I claim as new and desire to secure by Letters Patent of the United States is:

1. An educational xylophone comprising in combination: a xylophone instrument having a series of conducting sounding bars; lamps disposed adjacent the sounding bars, respectively, to identify the same when ignited; a selector switch having a movable terminal and a series of fixed terminals; a terminal board having contacts connected to the fixed terminals of the selector switch and the lamps, respectively, and adapted to receive a tune card connecting the contacts in tune indicating relationship; electrical means adapted to advance the selector switch in step-by-step fashion when successively energized; a hammer for striking the sounding bars and having a conducting head; and, means establishing an energizing circuit to the last means through the hammer and the sounding bars.

2. An educational xylophone comprising in combination: a xylophone instrument having a series of conducting sounding bars; a series of lamps disposed to indicate the sounding bars, respectively; selector switch means adapted to energize the lamps in tune-indicating succession as the selector switch means is successively energized; a hammer for striking the sounding bars and having a conducting head; and, means establishing an energizing circuit to the selector switch means through the sounding bars and the hammer.

3. An educational xylophone comprising, in combination, a xylophone mechanism having a series of electrically conducting sounding bars which produce musical notes when struck and a hammer having an electrically conducting head for striking the sounding bars, and means to indicate the next note to be struck with the hammer comprising a stepping relay having a plurality of terminals, a pole terminal, means for successively connecting the terminals to the pole terminal, and a coil, an actuating circuit including a source of power and the coil of the stepping relay connected between the sounding bars of the xylophone mechanism and the electrically conducting head of the xylophone hammer, a terminal board having two groups of contacts, the contact of one group being connected to the terminals of the stepping relay, a lamp for each sounding bar having a terminal connected to the pole terminal of the stepping relay and a second terminal connected to one of the second group of contacts on the terminal board, whereby an electrical circuit may be established through the stepping relay and lamps by placing a tune card having two groups of contacts thereon and shorting links between individual contacts of each group adjacent to the terminal board, the contacts of the terminal board contacting the contacts of the tune card.

4. An educational xylophone comprising, in combination, a xylophone mechanism having a frame with a pair of spaced members, a series of electrically conducting sounding bars which produce musical notes when struck suspended across the spaced members, and a hammer having an electrically conducting head for striking the sounding bars, and means to indicate the next note to be struck with the hammer comprising a stepping relay having a plurality of terminals, a pole terminal, means for successively connecting the terminals to the pole terminal, and a coil, an actuating circuit including a source of power and the coil of the stepping relay connected between the bars of the xylophone mechanism and the electrically conducting head of the xylophone hammer, a terminal board having two groups of contacts, the contacts of one group being connected to the terminals of the stepping relay, a lamp disposed adjacent to each sounding bar having one terminal connected to one of the second group of contacts on the terminal board, and a source of power connected between the pole terminal of the stepping relay and the other terminal of each of the lamps.

5. An educational xylophone comprising the elements of claim 4 wherein the coil of the stepping relay is connected to each of the sounding bars through a helical electrical conducting spring.

6. An educational xylophone comprising a xylophone mechanism having a frame with a pair of spaced members, a series of electrically conducting sounding bars which produce musical notes when struck suspended across the spaced members, and a hammer having an electrically conducting head for striking the sounding bars, and means to indicate the next note to be struck with the hammer comprising a stepping relay having a plurality of terminals, a pole terminal, means for successively connecting the terminals to the pole terminal, and a coil, an actuating circuit including a source of power and the coil of the stepping relay connected between the bars of the xylophone mechanism and the electrically conducting head of the xylophone hammer, a terminal board having two groups of contacts, the contacts of one group being connected to the terminals of the stepping relay, a lamp disposed adjacent to each sounding bar having one terminal connected to one of the second group of contacts on the terminal board, a source of power connected between the pole terminal of the stepping relay and the other terminal of each of the lamps, and a tune card having two groups of contacts thereon and shorting links between the individual contacts of each group, said tune card being disposed adjacent to the terminal board and the groups of contacts on the terminal board contacting the groups of contacts on the tune card.

7. An educational xylophone comprising a xylophone mechanism having a series of electrically conducting sounding bars which produce musical notes when struck and a hammer having an electrically conducting head for striking the sounding bars, means to indicate the next note to be struck with the hammer comprising a stepping relay having a plurality of terminals, a pole terminal, and a shorting bar successively connecting each of the terminals with the pole terminal, an actuating circuit for moving the shorting bar successively from one terminal to the next terminal including the stepping relay, the electrically conducting head of the hammer, and the electrically conducting sounding bars, said circuit being closed by contact of the head of the hammer with a sounding bar, a terminal board having two groups of contacts, the contacts of one group being connected to the terminals of the stepping relay, a lamp for each sounding bar having a terminal connected to the pole terminal of the stepping relay and a second terminal connected to one of the second groups of contacts on the terminal board, and a tune card having two groups of contacts thereon and shorting links between individual contacts of each group, the tune card being disposed adjacent to the terminal board and the contacts of each group of contacts on the tune card being in contact with one of the groups of contacts on the terminal board.

8. An educational xylophone comprising in combination: a xylophone instrument having a series of conducting sounding bars; electrical indicators disposed in identifying relationship to the sounding bars, respectively; a selector switch having a movable terminal and a series of fixed terminals; a terminal board having contacts connected to the fixed terminals of the selector switch and the indicators, respectively, and adapted to receive a tune card connecting the contacts in tune indicating relationship; electrical means adapted to advance the selector switch in step-by-step fashion when successively energized; a hammer for striking the sounding bars and having a conducting head; and, means establishing an energizing circuit to the last means through the hammer and the sounding bars.

No references cited.